United States Patent Office 3,637,652
Patented Jan. 25, 1972

3,637,652
DISPERSE MONOAZO DYESTUFFS
Brian Ribbons Fishwick, Manchester, England, assignor to Imperial Chemical Industries Limited, London, England
No Drawing. Continuation-in-part of abandoned application Ser. No. 308,681, Sept. 13, 1963. This application Mar. 23, 1966, Ser. No. 536,665
Claims priority, application Great Britain, Sept. 24, 1962, 33,487/62, 36,189/62, 36,190/62; Mar. 14, 1963, 10,164/63
Int. Cl. C09d 29/08
U.S. Cl. 260—207.1                    7 Claims

ABSTRACT OF THE DISCLOSURE

Disperse monoazo dyestuffs obtained by coupling a diazotised optionally substituted p-nitroaniline with a 3-formylamino-N:N-bis(carboalkoxyalkyl)aniline, and the use of the said dyestuffs for coloring synthetic textile materials.

---

This is a continuation-in-part application of application Ser. No. 308,681 which was filed on Sept. 13, 1963, and now abandoned.

This invention relates to new disperse dyestuffs of the benzene-azo-benzene series which are valuable for colouring synthetic textile materials in particular cellulose triacetate and aromatic polyester textile materials.

According to the invention there are provided the new disperse azo dyestuffs of the formula:

$$O_2N-\underset{(B)_m}{\overset{(A)_n}{\bigcirc}}-N=N-\underset{NH.CHO}{\overset{Z}{\bigcirc}}-N\underset{Y^1.COOR^1}{\overset{Y.COOR}{<}}$$

wherein
A is selected from the class consisting of hydrogen and nitro;
B is selected from the class consisting of hydrogen, chlorine and bromine;
Y and $Y^1$ each independently represent lower alkylene radicals;
R represents a lower alkyl radical;
$R^1$ is selected from the class consisting of hydrogen and lower alkyl;
Z is selected from the class consisting of hydrogen, lower alkyl and lower alkoxy;
and $n$ and $m$ each independently represent a positive integer not exceeding 2.

Throughout the specification the term "lower" is used to denote a radical containing not more than 5 carbon atoms.

As examples of the lower alkyl and lower alkoxy radicals represented by Z there may be mentioned methyl, ethyl, methoxy, ethoxy, propoxy and butoxy radicals. As examples of the lower alkyl radicals represented by R and $R^1$ there may be mentioned methyl, ethyl, propyl, butyl and amyl radicals. It is preferred that $R^1$ represents a lower alkyl radical. As examples of the lower alkylene radicals represented by Y and $Y^1$ there may be mentioned methylene, ethylene, trimethylene, tetramethylene, α-methylethylene and β-methylethylene radicals.

The new disperse azo dyestuffs of the invention can be obtained by coupling a diazotised amine of the formula:

$$O_2N-\underset{(B)_m}{\overset{(A)_n}{\bigcirc}}-NH_2$$

with a coupling component of the formula:

$$\underset{NH.CHO}{\overset{Z}{\bigcirc}}-N\underset{Y^1.COOR^1}{\overset{Y.COOR}{<}}$$

wherein A, B, $n$, $m$, Z, Y, $Y^1$, R and $R^1$ have the meanings stated; the coupling being carried out in aqueous medium at a pH below 7. The resulting dyestuff, which is insoluble in water can then be filtered off and dried.

The said coupling components may be obtained in several ways, for example:

(1) By condensing a primary amine of the formula:

$$\underset{NHCHO}{\overset{Z}{\bigcirc}}-NH_2$$

with two molecular proportions of a compound of the formula halogen-Y.COOR.

(2) By condensing the said primary amine with two molecular proportions of an α,β-unsaturated acid, such as acrylic acid, and esterifying the resulting product.

(3) By condensing the said primary amine with an ester of an α,β-unsaturated acid, for example methyl acrylate, and then condensing the resulting secondary amine with a compound of the formula halogen-Y.COOR. This method is usually employed when it is desired to obtain coupling components in which Y and $Y^1$, and/or R and $R^1$ represent different radicals.

The dyestuffs of the invention are particularly valuable for colouring synthetic textile materials, for example cellulose acetate and cellulose triacetate textile materials, but more especially aromatic polyester textile materials, such as polyetheneneterephthalate textile materials. Such textile materials can be in the form of threads, yarn or woven or knitted fabrics.

Aromatic polyester textile materials can be coloured with the dyestuffs of the invention by immersing the said materials in a dyebath comprising an aqueous dispersion of the dyestuff, and subsequently carrying out the dyeing at a temperature of about 100° C., usually in the presence of a carrier such as diphenyl or o-hydroxydiphenyl, or at temperatures above 100° C., for example at 130° to 140° C., under superatmospheric pressure, when a carrier is not necessary. If desired the dyebaths can contain dispersing agents such as sulphonated naphthalene-formaldehyde condensates.

Alternatively an aqueous dispersion of the said dyestuffs, which dispersion optionally contains a thickening agent, can be printed or padded onto the textile material which is then subsequently steamed or baked.

After applying the said dyestuffs to aromatic polyester textile materials the materials are preferably given a treatment in a hot aqueous solution of soap or a synthetic detergent and/or a treatment in a weak alkaline aqueous solution of sodium hydrosulphite which helps to remove loosely attached dyestuff from the surface of the textile material.

The disperse azo dyestuffs of the invention have excellent affinity and building-up properties on aromatic polyester textile materials which they colour in red to blue shades possessing very good fastness to washing, to dry heat treatments used in pleating operations, and to light.

A preferred class of the dyestuffs of the invention comprises the dystuffs of the formula:

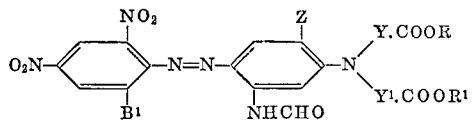

wherein Z, Y, $Y^1$, R and $R^1$ have the meanings stated, and $B^1$ represents a chlorine or a bromine atom. Such dyestuffs give valuable navy blue shades, particularly when Z represents a lower alkoxy radical. The dyestuffs of this class wherein R and $R^1$ each represent lower alkyl radicals are particularly valuable since they build-up to give very deep navy blue shades.

United Kingdom Pat. No. 491,793 discloses the manufacture of azo dyestuffs by coupling diazotised aromatic amines free from sulphonic and caroxylic acid groups with coupling components of the formula:

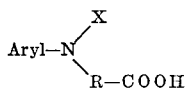

in which X may be a substituted alkyl radical, and R is an alkylene radical containing at least two methylene groups.

German Pat. No. 734,846 discloses the manufacture of azo dyes by diazotisation of an aromatic amine devoid of carboxylic and sulphuric acid groups and coupling with an arylaminocarboxyester of the formula:

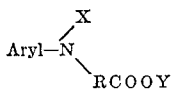

wherein R is a chain of at least 2 methylene groups, which can be substituted, Y may be an alkyl group and X may represent the group —RCOOY.

U.S. Pat. No. 2,373,700 discloses azo compounds of the formula:

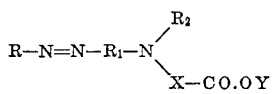

wherein R and $R_1$ may each represent benzene nuclei, X represents a short chain saturated aliphatic hydrocarbon group, Y may be an aliphatic group and $R_2$ may represent the group —X—CO.OY.

The dyestuffs of the present invention are not disclosed in any of the above mentioned references. Compared with the nearest comparable dyestuffs of United Kingdom Pat. No. 491,793 and German Pat. No. 734,846 the dyestuffs of the present invention have better fastness to heat on polyester textile material, and compared with the nearest comparable dyestuffs of U.S. Pat. No. 2,373,700 the dyestuffs of the present invention have better fastness to heat or to light.

The invention is illustrated but not limited by the following examples in which the parts are by weight:

EXAMPLE 1

2.62 parts of 2-bromo-4,6-dinitroaniline are added to a solution of 0.7 part of sodium nitrite in 15 parts of sulphuric acid and the mixture is heated at 55° C. for 4 hours. The diazo-solution so obtained is cooled to 5° to 10° C. and padded to a solution of 3.38 parts of 3-formamido-6-methoxy - N,N-bis-(β-carbomethoxyethyl) aniline in 50 parts of water, 50 parts of acetone and 1.2 parts of concentrated hydrochloric acid adding ice as required to keep the temperature of the mixture below 10° C. Stirring is continued for 1 hour at 10° C. and the precipitate is filtered off, washed acid-free with water and dried. Recrystallisation from butanol yields a product of melting point 159° C. The dye obtained dyes polyethylene terephthalate textile materials in navy blue shades having very good fastness to dry heat treatments and to light.

EXAMPLE 2

2.52 parts of 2,5-dichloro-4,6-dinitroaniline are added to a solution of 0.7 part of sodium nitrite in 15 parts of sulphuric acid. 25 parts of phosphoric acid (s. gr. 1.65) are then added at between —5° and 0° C. and the mixture is stirred at this temperature for 30 minutes. The diazo solution so obtained is coupled with 3.38 parts of 3-formamide-6-methoxy - N,N-bis - (β-carbomethoxyethyl)aniline using the technique described in Example 1. The dye so obtained dyes polyethylene terephthalate textile materials in reddish navy-blue shades having very good fastness to dry heat treatments and to light.

3-formamido - 6 - methoxy-N,N-bis-(β-carbomethoxy) aniline (which can also be described as 3-formamide-6-methoxy - N,N-bis[β-methoxycarbonylethyl]aniline) can be prepared by catalytic reduction of 6-methoxy-3-nitro-N,N-bis-(β-carbomethoxyethyl)aniline followed by formylation with formic acid. The nitro compound can be prepared by nitration of N,N-bis-(β-carbomethoxyethyl)-o-anididine which is itself obtained by condensation of o-anisidine with acrylic acid and subsequent esterification with methanol.

EXAMPLE 3

5.4 parts of 10 N hydrochloric acid are added to a solution of 1.725 parts of 2-chloro-4-nitraniline in 15 parts acetic acid, and the solution is stirred whilst cooling to 10° C. 51 parts of an aqueous solution containing 0.72 part sodium nitrite is then added and stirring continued for 10 minutes. 18 parts of cold water is then added, the diazonium solution filtered and added to a solution of 3.08 parts of 3-formamido-N,N-bis-(β-carbomethoxyethyl)aniline in 60 parts of 0.2 N hydrochloric acid and 30 parts of acetone stirring at between 5° and 10° C. Sodium acetate is then added until the mixture is no longer acid to Congo red and stirring at between 5° and 10° C. is continued for 16 hours. The precipitated dyestuff is filtered off, washed acid-free with water and dried. Recrystallisation from butanol yields a product of melting point 150° to 152° C.

This dystuff, when dispersed in aqueous medium, dyes polyester fibres in bright bludish-red shades having excellent fastness to dry-heat treatments and to light.

The following table gives further examples of the disperse azo dyestuffs of the invention which are obtained by diazotising the amines listed in the second column of the table and coupling the resulting diazo compounds with the coupling components listed in the third column of the table by methods similar to those described in Examples 1 to 3. The fourth column of the table indicates the shades obtained when the dystuffs are applied to polyethylene terephthalate textile materials.

| Example | Amine | Coupling component | Shade |
|---|---|---|---|
| 4 | 6-bromo-2,4-dinitroaniline | 3-formamido-6-methoxy-N,N-bis($\beta$-carboethoxyethyl)aniline | Navy blue. |
| 5 | do | 3-formamido-6-methoxy-N,N-bis($\beta$-carbo-n-propoxyethyl)aniline | Do. |
| 6 | do | 3-formamido-6-methoxy-N,N-bis($\beta$-carbo-isopropoxyethyl)aniline | Do. |
| 7 | do | 3-formamido-6-methoxy-N,N-bis($\beta$-carbo-isobutoxyethyl)aniline | Do. |
| 8 | do | 3-formamido-6-methoxy-N,N-bis($\beta$-carbo-n-amyloxyethyl)aniline | Do. |
| 9 | do | 3-formamido-6-methoxy-N-($\beta$-carbomethoxyethyl)-N-($\beta$-carboethoxyethyl)aniline. | Do. |
| 10 | do | 3-formamido-6-ethoxy-N,N-bis($\beta$-carbomethoxyethyl)aniline | Do. |
| 11 | do | 3-formamido-6-methyl-N,N-bis($\beta$-carbomethoxyethyl)aniline | Violet. |
| 12 | do | 3-formamido-6-ethyl-N,N-bis($\beta$-carbomethoxyethyl)aniline | Do. |
| 13 | 2,5-dichloro-4-nitroaniline | 3-formamido-N,N-bis($\beta$-carbomethoxyethyl)aniline | Bluish-red. |
| 14 | 2,6-dibromo-4-nitroaniline | do | Reddish-brown. |
| 15 | 2,6-dichloro-4-nitroaniline | 3-formamido-6-methoxy-N,N-bis($\beta$-carbomethoxyethyl)aniline | Do. |
| 16 | do | 3-formamido-N,N-bis($\beta$-carbomethoxyethyl)aniline | Do. |
| 17 | 2-bromo-4-nitroaniline | do | Bluish-red. |
| 18 | 4-nitroaniline | do | Red. |
| 19 | 2,4,6-trinitroaniline | 3-formamido-6-methoxy-N,N-bis($\beta$-carbomethoxyethyl)aniline | Navy blue. |
| 20 | 6-chloro-2,4-dinitroaniline | 3-formamido-N-($\beta$-carboxyethyl)-N-($\beta$-carbomethoxyethyl)aniline | Reddish-brown. |
| 21 | do | 3-formamido-6-methoxy-N-($\beta$-carbomethoxyethyl)-N-($\gamma$-carboethoxypropyl)aniline. | Navy blue. |

What I claim is:

1. The disperse azo dyes of the formula:

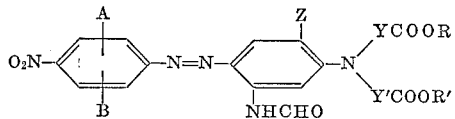

wherein

A and B are each independently selected from the class consisting of hydrogen, nitro and halogen wherein said halogen is selected from the class consisting of chlorine and bromine;

Y and Y' each independently represent lower alkylene radicals;

R represents a lower alkyl radical;

R' is selected from the class consisting of hydrogen and lower alkyl; and

Z is selected from the class consisting of hydrogen, lower alkyl and lower alkoxy.

2. The disperse azo dyestuffs, as claimed in claim 1, which are of the formula:

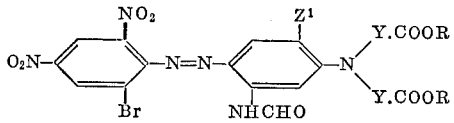

wherein $Z^1$ is a lower alkoxy radical,

Y is a lower alkylene radical, and R is a lower alkyl radical.

3. The disperse azo dyestuffs, as claimed in claim 1, which are of the formula:

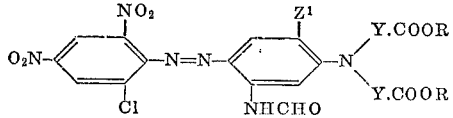

wherein $Z^1$ is a lower alkoxy radical,

Y is a lower alkylene radical, and R is a lower alkyl radical.

4. The disperse azo dyestuff, as claimed in claim 1, which is of the formula:

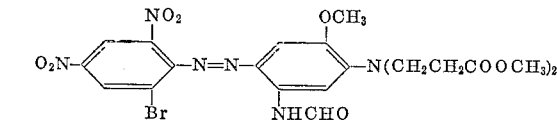

5. The disperse azo dyestuff, as claimed in claim 1, which is of the formula:

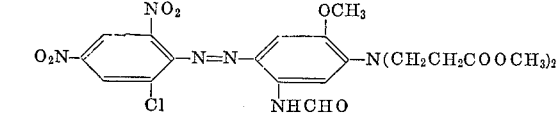

6. The disperse azo dyestuff, as claimed in claim 1, which is of the formula:

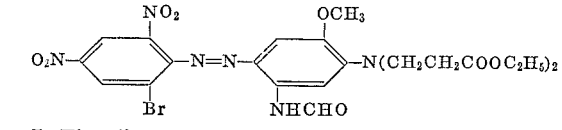

7. The disperse azo dyestuff, as claimed in claim 1, which is of the formula:

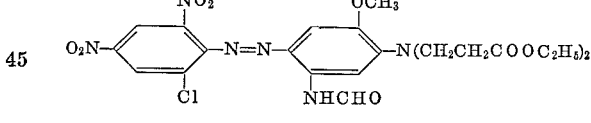

References Cited

UNITED STATES PATENTS 2,111,300  3/1938  Senn _____ 260—207

CHARLES B. PARKER, Primary Examiner

D. M. PAPUGA, Assistant Examiner

U.S. Cl. X.R.

260—207, 471 A